(12) United States Patent
White et al.

(10) Patent No.: US 11,087,430 B2
(45) Date of Patent: Aug. 10, 2021

(54) CUSTOMIZABLE RENDER PIPELINES USING RENDER GRAPHS

(71) Applicant: Apple Inc., Cupertino, CA (US)

(72) Inventors: Cody J. White, San Francisco, CA (US); Randal W. Lamore, San Francisco, CA (US); Pal-Kristian Engstad, Topanga, CA (US); Ivan Gavrenkov, Palo Alto, CA (US); Matthew Stoll, San Jose, CA (US); Yang Zhou, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/586,370

(22) Filed: Sep. 27, 2019

(65) Prior Publication Data
US 2020/0104970 A1    Apr. 2, 2020

Related U.S. Application Data

(60) Provisional application No. 62/738,866, filed on Sep. 28, 2018.

(51) Int. Cl.
| | |
|---|---|
| *G06T 1/00* | (2006.01) |
| *G06T 1/20* | (2006.01) |
| *G06F 8/34* | (2018.01) |
| *G06T 15/00* | (2011.01) |
| *G06T 1/60* | (2006.01) |

(52) U.S. Cl.
CPC ............. *G06T 1/20* (2013.01); *G06F 8/34* (2013.01); *G06T 1/60* (2013.01); *G06T 15/005* (2013.01)

(58) Field of Classification Search
CPC ......... G06T 19/00; G06T 13/20; G06T 15/00; G06T 17/005; G06T 2210/61; G06F 8/34; G06F 40/137
See application file for complete search history.

(56) References Cited

U.S. PATENT DOCUMENTS

| | | | |
|---|---|---|---|
| 8,427,492 B2 | 4/2013 | Hervas | |
| 8,935,249 B2 | 1/2015 | Traub | |

(Continued)

OTHER PUBLICATIONS

"Stingray Renderer Walkthrough #7: Data-driven rendering," Mar. 8, 2017, Autodesk Stingray, Retrieved from the Internet: URL: http://bitsquid.blogspot.com/2017/03/stingray-renderer-walkthrough-7-data.html [retrieved on Sep. 27, 2018].

(Continued)

*Primary Examiner* — Hau H Nguyen
(74) *Attorney, Agent, or Firm* — Blank Rome LLP (57) ABSTRACT

Systems, methods, and computer readable media to data drive a render graph are described. A render graph system defines one or more nodes for a render graph and one or more render targets associated with the nodes. The nodes includes one or more functions to define and resolve target handles for identifying render targets. The render graph system defines one or more connections between the nodes and render targets. The connection between the nodes and render targets form the render graph. The render graph system stores the render graph as a data file and converts, with a render graphics API, the data file into a render graph data object. The render graph system performs a frame setup phase the setups the render graph for a frame based on the render graph data object.

20 Claims, 5 Drawing Sheets

(56) References Cited

U.S. PATENT DOCUMENTS

| | | |
|---|---|---|
| 9,589,382 B2 | 3/2017 | Wilson |
| 2008/0278482 A1* | 11/2008 | Farmanbar .............. G06T 15/00 |
| | | 345/419 |
| 2017/0109933 A1 | 4/2017 | Voorhees |

OTHER PUBLICATIONS

Gansner, Emden R., and Stephen C. North, "An open graph visualization system and its applications to software engineering," Software—Practice and Experience, 00(S1), 1-5 (1999).

Persson, Tobias, "Highl-Level Rendering Using Render Graphs," Our Machinery, Aug. 28, 2017, Retrieved from the Internet: URL: https://ourmachinery.com/post/high-level-rendering-using-render-graphs/ [retrieved on Sep. 27, 2018].

* cited by examiner

CUSTOMIZABLE RENDER PIPELINES USING RENDER GRAPHS

BACKGROUND

This disclosure relates generally to the field of graphics processing. More particularly, but not by way of limitation, this disclosure relates to implementing a customizable render pipeline that automatically manages render targets.

Graphics processor units (GPUs) have become important for processing data parallel graphics tasks in today's computers, mobile devices, and other computing systems. Developers have also been taking advantage of a GPU's parallel capabilities by having the GPU execute non-graphics data tasks in a parallel manner. Vendors and standards organizations have created application programming interfaces (APIs) that make executing data-parallel tasks easier to program because of the high level of developer programming interaction. For example, there are a variety of low level APIs (libraries and frameworks) that reside close to graphics hardware and generally employ outputs from higher level APIs. Specifically, the higher level APIs typically prepare program code for an application and presents the program code to the lower level APIs to process.

Today's graphics processing landscape includes improving real-time graphics rendering. To implement real-time graphics rendering, a modern rendering engine generally needs to be flexible enough to allow for custom programming and a level of configurability to form complicated rendering pipelines. Rendering typically start with an application making a graphics change resulting in a change to a scene. To generate a frame for the scene, a rendering engine may employ several rendering passes prior to committing content to the frame buffer. For example, effects may be sequentially applied to a graphic element, such as lighting, shadows, reflections, specular illumination, etc. In another example, multiple rendering passes may be employed for creating pieces or subsets of a single frame to be composited later to form the entire frame. The use of multiple rendering passes could causes latency that varies dependent upon the speed of the system and the complexity and rate of change of the graphics. For example, in a gaming application, the extent and complexity of graphics can be resource demanding and differs from other graphics application (e.g., three dimensional (3D) modeling). Having an API that is flexible enough to produce rendering pipelines that accommodate a variety of systems and/or graphics application may be beneficial in improving processing time and latency.

SUMMARY

In one embodiment, a method to data drive a render graph. The example method defines one or more nodes for a render graph and one or more render targets associated with the nodes. The nodes includes one or more functions to define and resolve target handles for identifying render targets. The example method defines one or more connections between the nodes and render targets. The connection between the nodes and render targets form the render graph. The example method stores the render graph as a data file and converts, with a render graphics API, the data file into a render graph data object. The example method performs a frame setup phase the setups the render graph for a frame based on the render graph data object.

In another embodiment, a system that comprises memory comprising instructions and at least one processor coupled to memory, where the instructions, when executed, causes the at least one processor to define one or more nodes for a render graph and one or more render targets associated with the nodes. The nodes includes one or more functions to define and resolve target handles for identifying render targets. The processor defines one or more connections between the nodes and render targets. The connection between the nodes and render targets form the render graph. The processor stores the render graph as a data file and converts, with a render graphics API, the data file into a render graph data object. The processor performs a frame setup phase the setups the render graph for a frame based on the render graph data object.

In one embodiment, each of the above described methods, and variation thereof, may be implemented as a series of computer executable instructions. Such instructions may use any one or more convenient programming language. Such instructions may be collected into engines and/or programs and stored in any media that is readable and executable by a computer system or other programmable control device. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosure includes various example embodiments that create a modular and customizable render pipeline that can be authored in code, driven by data, or both. In particular, a render graph application program interface (API) is able to generate both data driven and code driven render graphs by supporting a developer's ability to create rendering pipelines at varying programming levels. At a top programming level, the render graph API is able to generate a render frame with data-driven render graphs by having the developer interface with a visual graph editor. The visual graph editor is a user interface (UI) for a developer to create and author a visual graph representation of a desired render frame and/or render graphs. The visual graph editor can also provide hooks for a developer to attach render graph assets to portions of a render frame. Based on the visual graph representation, the render graph API generates a render graph asset (e.g., data file) that specifies how a backend render engine generates the render graphs. At the next programming level below the top programming level, the render graph API provides a developer access to portions of a backend render engine by allowing the developer to create with code one or more render graphs that form a render frame. For example, the render graph API exposes and handles inputs and/or outputs of render graphs using a render frame program object. At a next lower programming level, the render graph API provides access to the backend render engine so that a developer is able to write code for managing a collection of nodes of the render graph. Each of the nodes consist of a setup and execute function that declare target usage and dependencies (e.g., setup function) and resolves target handles into textures and performs graphics commands (e.g., execute function).

For the purposes of this disclosure, the term "render graph asset" refers to a digital file that specifies how a backend render engine generates a specific render graph. In one or more embodiments, the "render graph asset" is represented as a JavaScript Object Notation (JSON) data file. A "render graph asset" is similar to other graphics-based assets (e.g., mesh asset or texture asset) in that a developer is able to reuse and/or modify the "render graph asset" for desired purposes. As used herein, the term "render graph" represents a collection of nodes that perform render (e.g., shader) and/or compute operations (e.g., compute kernel) for a rendering pipeline. In one or more embodiments, a "render graph" represents a rendering pass that executes the rendering pipeline. Additionally or alternatively, a "render graph" represents a rendering layer that separates different scene objects into separate images As used herein, the term "render target" refers to an allocation of memory space for storing data related to executing graphics commands on a graphics processor, such as a GPU. For example, the term "render target" refers to any memory space that a processor and/or a graphics processor access and/or modify when creating and executing a graphics command. For example, the term "render target" includes graphics API resources (e.g., Direct3D® resources), such as buffers and textures. Buffers represent an allocation of unformatted memory that can contain data, such as vertex, shader, and compute state data. Textures represents an allocation of memory for storing formatted image data. In one or more embodiments, the "render target" represent temporary buffers for performing one or more graphics processing tasks. For the purposes of this disclosure, the term "target handle" refers to an abstract reference to a "render target."

Figure 1:
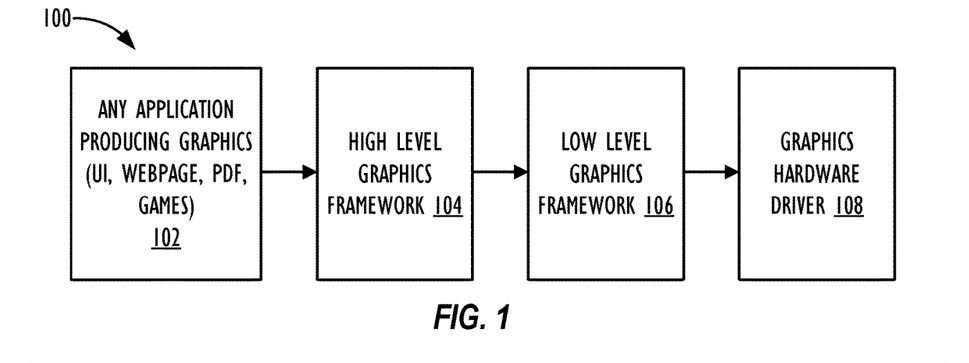
FIG. 1 is a diagram of a graphics processing flow where implementations of the present disclosure may operate.

FIG. 1 is a diagram of a graphics processing flow 100 where implementations of the present disclosure may operate. FIG. 1 illustrates that an application producing graphics 102 may issue a graphics requests for a frame in a scene that a high level graphics framework 104 analyzes and processes. Examples of application producing graphics 102 include gaming applications, 3D modeling applications, web browser applications, and document viewer applications (e.g., portable document format (pdf) viewer). The high level graphics framework 104 interacts with a low level graphics framework 106 to manage changes between frames (e.g., movement of graphics on a screen). The low level graphics framework passes the graphics request to a hardware driver 108, after which the hardware (e.g., a graphics processor) may process the data and populate the frame buffer. Although FIG. 1 does explicitly illustrates this, there are many software paths to a display device including layers and other frameworks not illustrated in FIG. 1, but the general software architecture options are well known in the art.

In one or more embodiments, the low level graphics framework 106 may be associated with a library that offers granular control of GPU operations. In particular, some embodiments have a low level graphics framework 106 that has one or more of the following capabilities or features: direct control of GPU state vectors; facilitation of direct determination/selection of the command buffers being submitted to hardware (encoding and submission); ability to delay commit actions (e.g., the ability to delay commitment or commit command buffers in parallel); offers a standard library; and/or provides granular control of the GPU (e.g., control of the organization, processing, and submission of graphics and computation commands, as well as the management of the associated data and resources for these commands). In some embodiments, the low-level graphics framework may be or may include a standard or published API or library. Examples of low-level graphics framework 106 include Mantle or Direct3D®.

The ability to control the GPU closely through a published low level graphics framework 106 provides advantages that may facilitate a more orderly rendering path while allowing application 102 to use a high level graphics framework 104 to interface with a system's graphics capabilities. In one or more embodiments, the high level graphics framework 104 represents a render graph API that generates render graph assets based on data-driven and/or a code-driven operations. For each frame of a scene, the render graph API is able to break up rendering into a collection of interconnected render graphs. Each of the render graphs includes a collection of nodes, where each node consist of a setup and execute function associated with a render or computer operation. In some embodiments, the render graphs are data driven, where the high level graphics framework 104 (e.g., render graph API) analyzes the data and generates graphics commands expressed in a low level GPU interface language, such as graphics commands facilitated by low level graphics framework 106 (e.g., Direct3D®). Other embodiments, could include code-driven render graphs and/or nodes within a render graph to generate the graphics commands.

Figure 2:
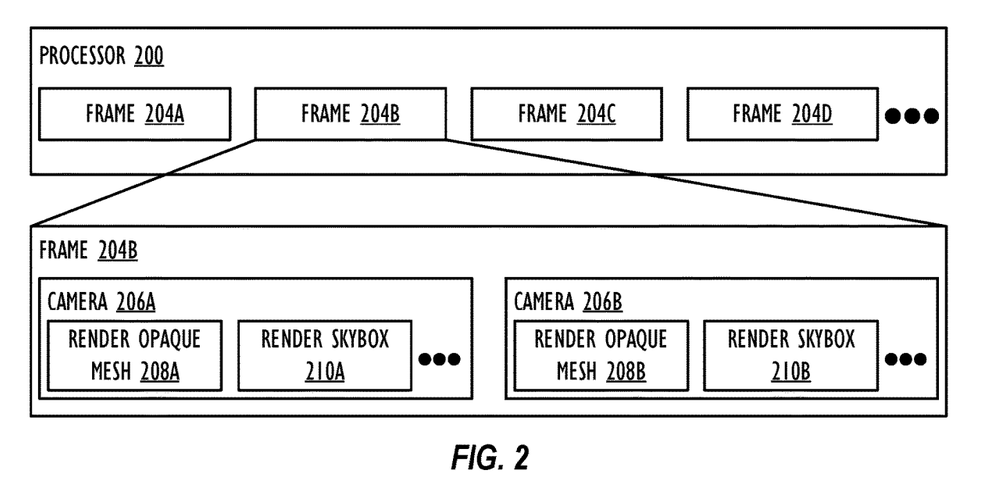
FIG. 2 illustrates an embodiment of a processor that processes multiple frames generated for an application.

FIG. 2 illustrates an embodiment of a processor 200 that processes multiple frames 204 generated for an application. Processor 200 represents a programmable hardware device that is able to process data from one or more data sources, such as memory. In FIG. 2, processor 200 is a general-purpose processor (e.g., a central processing unit (CPU) or microcontroller) that is not customized to perform specific operations (e.g., processes, calculations, functions, or tasks), and instead is built to perform general compute operations. Although FIG. 2 illustrates that processor 200 is a general-purpose processor, other types of processors could include specialized processor customized to perform specific operations (e.g., processes, calculations, functions, or tasks). Examples of specialized processors include GPUs, floating-point processing units (FPUs), DSPs, FPGAs, application-specific integrated circuits (ASICs), and embedded processors (e.g., universal serial bus (USB) controllers).

Processor 200 encodes and submits graphics commands that render frames 204A-204D to a graphics processor (not shown in FIG. 2). The graphics processor is a specialized processor for performing graphics processing operations. Examples of "graphics processors" include a GPU, DSPs, FPGAs, and/or a CPU emulating a GPU. In one or more embodiments, a graphics processor is also able to perform non-specialized operations that a general-purpose processor is able to perform. Examples of these general compute operations are compute commands associated with compute kernels. A compute kernel refers to a program for a graphics processor (e.g., GPU, DSP, or FPGA). In the context of graphics processing operations, programs for a graphics processor are classified as a compute kernel or a shader. A compute kernel refers to a program for a graphics processor that performs general compute operations (e.g., compute graphics commands), and the term shader refers to a program for a graphics processor that performs graphics operations (e.g., render graphics commands). For purposes of this disclosure the term compute kernel, differs and should not be confused with the term kernel or operating system kernel.

Each frame 204A-204D is a representation of a single scene that a graphics processor renders. In FIG. 2, the scene content can change from frame 204 (e.g., frame 204A) to frame 204 (frame 204B). In one or more embodiments, to render the changes for each frame 204 (e.g., frame 204B) a graphics processor partitions the frame 204 by executing multiple rendering passes. By utilizing multiple rendering passes, graphics processor deconstructs each frame 204 into multiple component images that can be altered independently before recombining them. For example, rendering passes can separate out different features of a scene for a frame (e.g., shadows, highlights, or reflections) into the separate component images.

In FIG. 2, frame 204B is divided based on different camera render layers 206A and 206B, where each camera render layer 206 corresponds to a specific camera perspective of the scene. A camera perspective may be based on a variety of parameters, such as position, rotation, scale, field of view, and clipping. Having two camera render layers 206A and 206B does not cause a graphics processor to draw the entire scene twice, but instead, draws the scene according to different camera perspectives. In other words, each camera render layer 206 outputs scene objects that are visible to its specific camera perspective. Because of the different camera perspective, camera render layer 206A can produce one or more scene objects that are not rendered in camera render layer 206B and vice versa. The scene objects not rendered represent scene objects that are not viewable according to the camera perspective for camera render layer 206B.

Each camera render layer 206A and 206B can be further divided into different graphics operations (e.g., render operations). FIG. 2 illustrates that both camera render layer 206A and 206B are broken down into a render opaque mesh operation 208A and a render skybox operation 210A. The render opaque mesh operation 208A includes one or more render commands for drawing meshes. Render skybox operation 210 also includes one or more render commands for drawing skyboxes. For example, the skybox operation 210 is able to render skyboxes around a scene to create a complex scenery at a horizon according to a specific camera perspective. Persons of ordinary skill in the art are aware that camera render layers 206A and 206B can include other graphics operations pertinent to rendering a scene for a specific camera perspective.

Figure 3:
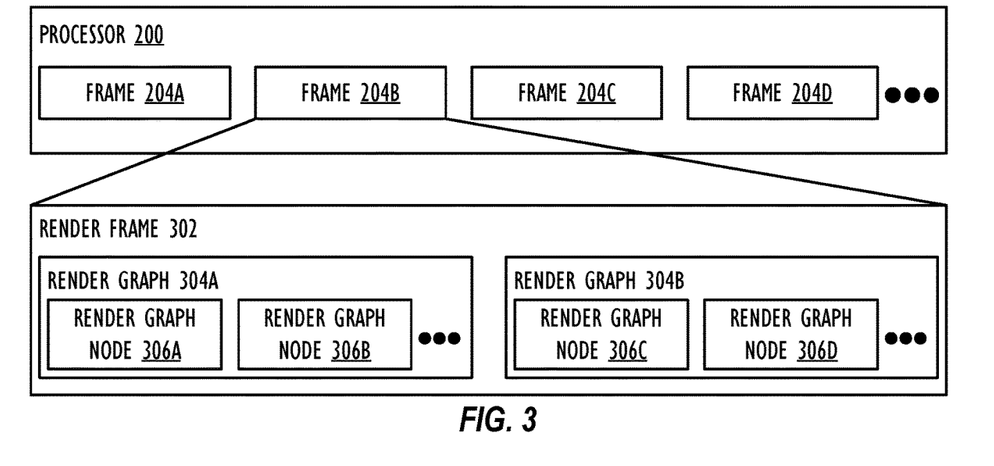
FIG. 3 illustrates an embodiment of a processor for processing multiple frames based on a render graph API.

FIG. 3 illustrates an embodiment of a processor 200 for processing multiple frames 204 based on a render graph API. As shown in FIG. 3, a render graph API subdivides frame 204B into different API program objects. In comparison to FIG. 2, FIG. 3 illustrates that render graph API represents frame 204B with a render frame program object 302 and camera render layers 206A and 206B with render graph program objects 304A and 304B, respectively. The different graphics operations within a camera render layers 206A and 206B are represented as render graph nodes 306A-306D. With reference to FIG. 2, the render graph API represents the render opaque mesh operations 208A and 208B into a render graph nodes 306A and 306C, respectively. Render sykbox operations 210A and 210B in FIG. 2 are represented as render graph nodes 306B and 306D, respectively.

Figure 4:
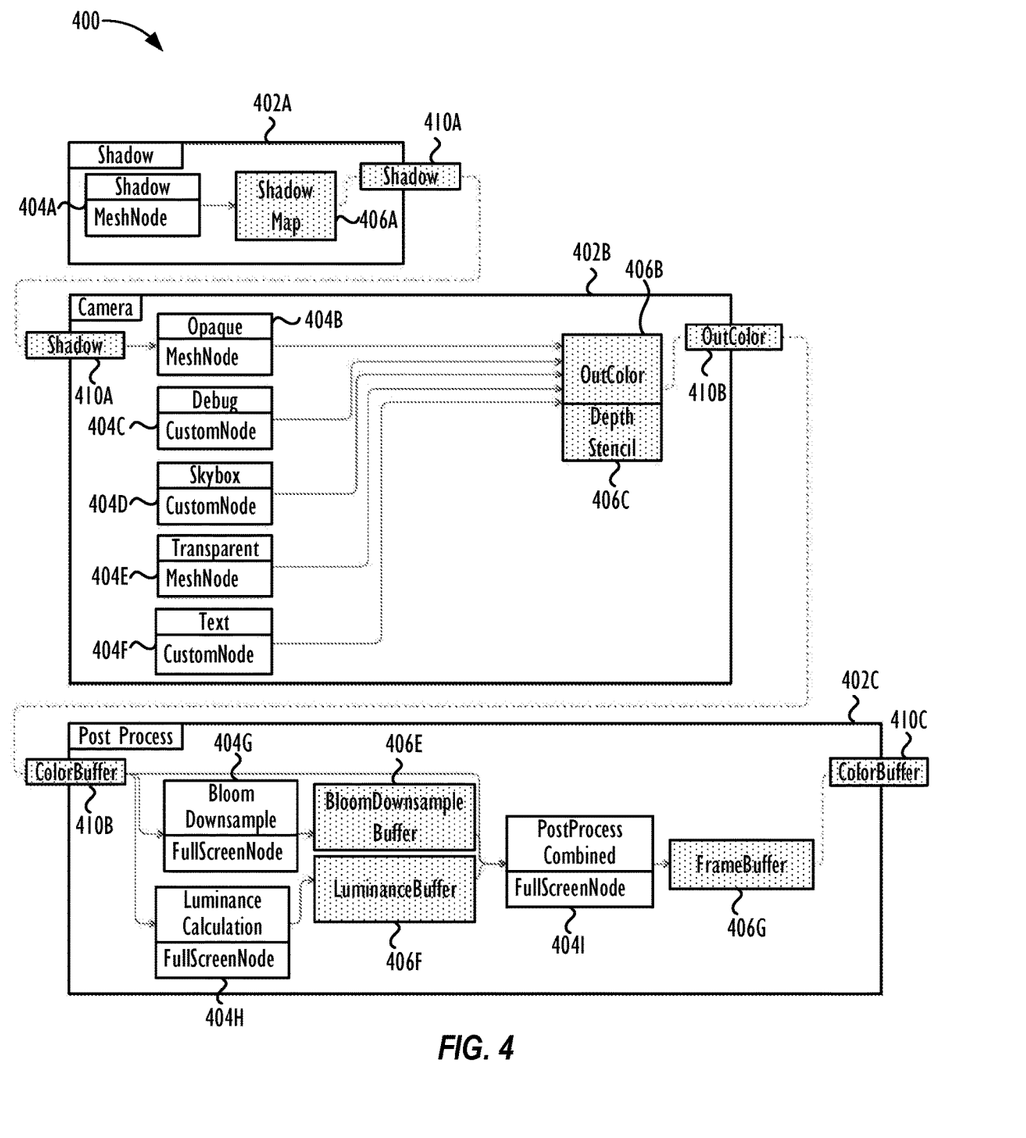
FIG. 4 depicts a graphical representation of a render frame that includes multiple render graphs built using a render graph API.

FIG. 4 depicts a graphical representation of a render frame 400 that includes multiple render graphs 402A-402C built using a render graph API. Each render graph 402 represents a rendering pipeline that a render pass or a render layer is able to execute. In FIG. 4, the render frame 400 includes three different render graphs 402A-402C sequentially connected together. The shadow render graph 402A represents a rendering pipeline for a shadow pass; the camera render graph 402B represents a rendering pipeline for a camera render layer; and the post process render graph 402C represents a rendering pipeline for a post process pass. To generate render frame 400, the render graph API connects the shadow render graph 402A sequentially to the camera render graph 402B, which then connects to the post process render graph 402C. In particular, the shadow render graph 402A outputs a shadow buffer 410A, which then inputs to the camera render graph 402B. The camera render graph 402B uses the shadow buffer 410A to output an OutColor buffer 410B, which then becomes an input to the post process render graph 402C. The post process render graph 402C uses the OutColor buffer 410B to output to color buffer 410C.

Within each render graph 402A-402C includes one or more nodes 404A-404I. Each node 404 represents a graphics operation that performs one or more graphics commands for a given rendering pipeline. Using FIG. 4 as an example, the shadow render graph 402A includes a shadow node 404A; the camera render graph 402B includes opaque node 404B, debug node 404C, skybox node 404D, transparent node 404E, and text node 404F; and the post process render graph 402C includes a bloom downsample node 404G, luminance calculation node 404H, and a post process combined node 404I. The shadow node 404A, opaque node 404B, and transparent node 404E have a mesh node type indicative of graphics operations that generate and encode draw mesh graphics commands. The debug node 404C, skybox node 404D, and test node 404F have a custom node type that performs developer tailored operations that generate graphics commands. As an example, a developer may have written or provided code for that performs a custom graphics operation that generate graphics command for rendering a sky box. The bloom downsample node 404G, luminance calculation node 404H, and a post process combined node 404I represent full screen type nodes that represent graphics operations for generating graphics commands that render to an entire screen.

FIG. 4 also illustrates that processing resources for generating render frame 400 are shown as shaded boxes. The render graphs 402A-402C include rendering targets 406A-

406G that nodes 404A-404I may utilize. In FIG. 4, the rendering targets 406A-406G represent intermediate memory buffers for storing graphics data prior to outputting graphics data (e.g., pixel data) to a render graph output buffer, such as shadow buffer 410A, OutColor buffer 410B, and color buffer 410C. For FIG. 4, the shadow node 404A generates data for a shadow map 406A; nodes 404B-404F within camera render graph 402B outputs image information (e.g., pixel data) to an output color buffer 406B. Depth stencil 406C could represent a depth buffer and/or stencil buffer for tracking depth of pixels on the screen and which fragments should be drawn and not drawn. The other rendering targets 406E, 406F, and 406G correspond to post processing buffers. The shadow buffer 410A, OutColor buffer 410B, and color buffer 410C represent processing resources that another render graph 402 is able to utilize.

In one or more embodiments, a developer uses a visual graph editor to create render frame 400. In other words, rather than writing code to generate the render graphs 402A-402C, the developer is able define the different rendering pipeline to render a frame using some type of human readable representation (e.g., a visual graphical representation). The visual graph editor can also provide hooks for attaching render graph assets to a render frame 400. After a developer generates the human readable representation for render frame 400, the render graph API can convert the human readable representation into one or more data files that specifies how data flows through a backend render engine. For example, the render graph API can create a data file for each render graph 402. Specifically, the render graph API creates a data file for the shadow render graph 402A, another data file for the camera render graph 402B, and third data file for the post process render graph 402C. Each data file signifies a render graph asset that can be reused and/or modified to render other frames.

The render graph asset is able to define a collection of nodes, render targets, and the connections between nodes and render targets for a render graph. In a data-driven operation, the render graph API compiles the render graph asset to generate a render graph data object that is feed into a backend render engine. Based off the render graph data object, the backend render engine builds a render graph that manages the collection of nodes. Each of the nodes consist of a setup function and an execute function that can be implemented as callback operations using lambda functions. A setup function declares render target usage and dependencies amongst the render graph nodes and render targets, and a execute function resolves target handles into graphics resources (e.g., a texture) and implement certain graphics commands (e.g., draw call for a collected meshes with a given set of materials). In one or more implementations, the backend render engine is able to manage the render target creation and/or memory aliasing for the render targets.

Although FIG. 4 illustrates a specific implementation of render frame 400, the disclosure is not limited to the specific implementation illustrated in FIG. 4. Persons of ordinary skill in the art are aware that a variety of other rendering passes and/or rendering layers may be created to generate render frame 400. The use and discussion of FIG. 1 is only an example to facilitate ease of description and explanation.

Figure 5:
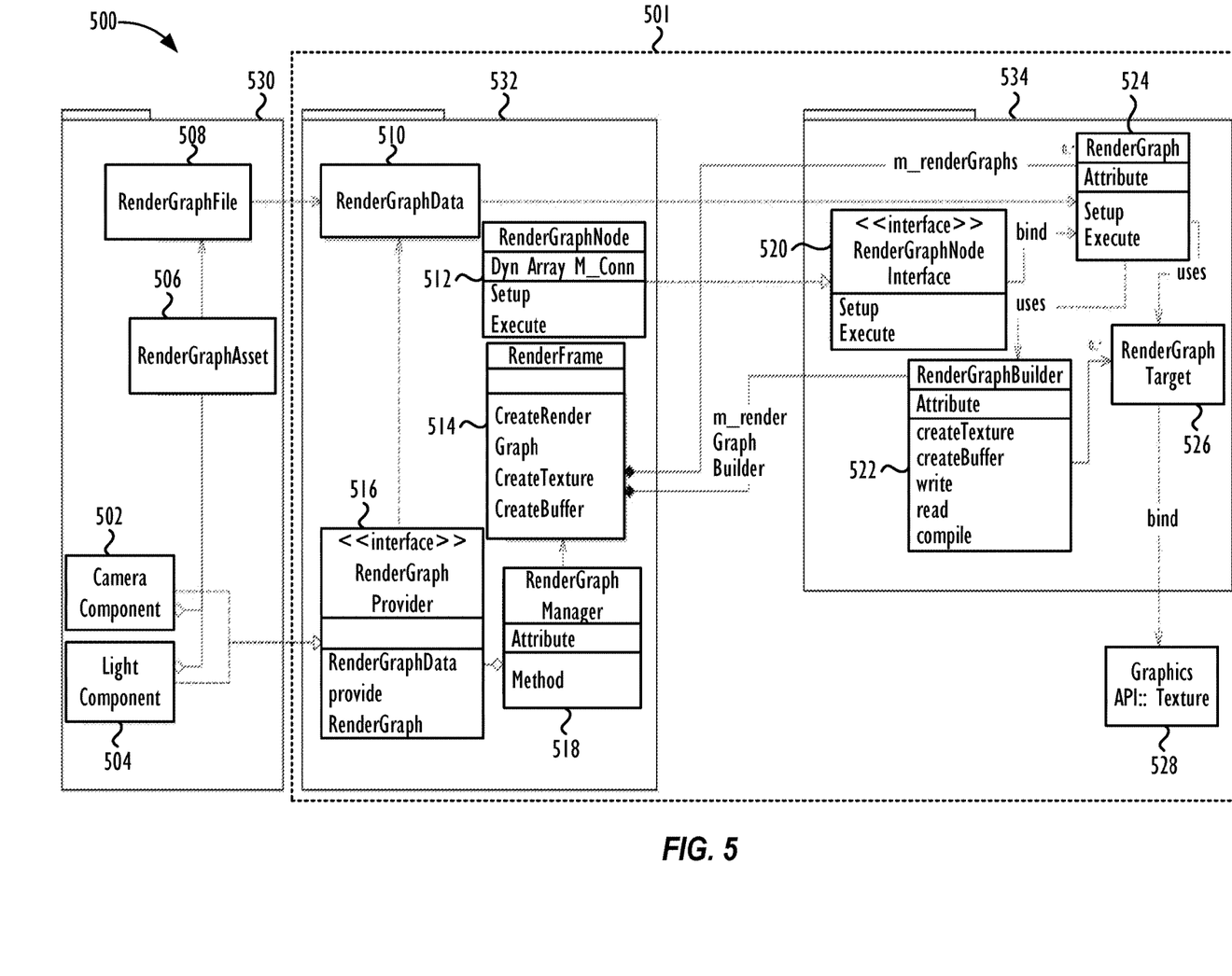
FIG. 5 represents a render graph system that employs a render graph API to data-drive and/or code-drive a render graph.

FIG. 5 represents a render graph system 500 that employs a render graph API to data-drive and/or code-drive a render graph. FIG. 5 illustrates that the render graph system 500 is logically divided into multiple programming levels that provides a developer different levels of access into the backend render engine 501. At a top programming level 530, a developer utilizes a visual graph editor to create a human readable representation (e.g., visual graphic representation) for render frames and/or render graphs. At a next lower programming level 532, the render graph API allows a developer to write a render graph and/or render frame in code by exposing the input and/or outputs of nodes and render graphs. At programming level 534, a developer is able to write code for how the backend render engine 501 writes pixels to a screen from start to finish. The backend render engine 501 manages render target creation, aliasing, and/or memory management operations. The render graph API also allows a developer to access a low level graphics API (e.g., Direct3D®) to generate graphics commands for rendering frames.

The top programming level 530 allows a developer to generate a variety of render graph assets for a frame. In FIG. 5, a visual graph editor allows a developer to generate render graphs for camera component 502 and light component 504. A developer can create a render graph for the camera component 502 and/or light component 504 by utilizing the render graph asset pipeline 506. The render graph asset pipeline 506 can create the render graph by having the developer create a human readable representation of the render graph and/or obtain the previously created and saved render graphs. For example, a developer may utilize the visual graph editor to modify already created render graph assets. The render graph asset pipeline 506 then generates render graph file 508 for each render graph. In one or more embodiments, the render graph file 508 is a JSON file that defines the collection of nodes, render targets, and the connections between the nodes and render targets. The render graph API compiles the render graph file 508 to generate render graph data object 510. By generating the render graph data object 510, the visual graph editor is able to provide hooks for attaching different render graph assets to a render graph provider and/or other program objects.

To data-drive render graphs, the render graph node program object 512 can expose nodes to the visual graph editor through introspection. The render graph file 508 can define the inputs, outputs and settings for the nodes in a render graph. The visual graph editor also exposes hooks to a developer to apply the render graph program object 524 to a render graph provider program object 516 with a render graph provider interface. As shown in FIG. 5, by utilizing the render graph provider interface, the render graph provider program object 516 may provide a type string and a function to return the render graph data object 510. Components, such as camera component 502 may utilize the render graph provider interface to implement a render graph provider program object 516 and have an render graph asset handle (e.g., an identifier) to render graph file 508. By doing so, at runtime, when the camera is rendered, the camera component 502 is able to provide its own render graph rather than a default one.

At programming level 532, the render graph API allows a developer to access portions of the backend render engine 501 to write a render graph in code. To write a render graph in code, the developer can use render graph node program object 512, render frame program object 514, and render graph manager program object 518. The render graph node program object 512 acts as an interface that exposes one or more parameters for a node in a render graph. For example, the render graph node program object 512 exposes the inputs and/or outputs of the node as members and is also the base class for implementing any type of render graph nodes. For example, a render graph node program object 512 corresponds to a mesh node that emits draw calls for collected meshes with specific materials.

The render frame program object 514 handles inputs and output between render graphs. Using a shadow operation example, a developer could have a render graph with many shadow casting lights as well as render graphs of different cameras to view the different shadows. Each of the render graphs could have a same collection of nodes to produce an image output of the scene. The render frame program object 415 allows a developer to break rendering the scene into a collection of the render graphs and interconnects the render graphs. In FIG. 5, a developer can use the render frame program object 514 to create the render graph builder program object 522 and manage the render graph builder program object 522 across render graphs' setup and compilation phases.

The render frame program object 514 is also able to use the render graph provider program object 516. As shown in FIG. 5, a render graph manager program object 518 may manage when to provide a render graph to process portions of a frame's rendering. To do this, render graph provider program objects 516 register with the render graph manager program object 518. The render graph manager program object 518 can map a key to identify a render graph provider program object 516. The render graph provider program object 516 can opt in to provide a render graph for any arbitrary chunk of a render frame. For example, a camera can implement graph provider program object 516 and produce a render graph for the render frame. Recall that having a render graph provider program object 516 allows a visual graph editor to provide hooks to optionally data-drive the production of render graph program object 524.

At top programming level 530, the render graph API allows a developer to access portions of the backend render engine 501 to write code for how the backend render engine 501 writes pixels to a screen from start to finish. The render graph node interface program object 520 represents the basic unit of the render graph system 500 for implementing programming objects. Each of the render graph node interface program object 520 consists of a setup and an execute function. The setup function allows a developer to declare render graph target 526 and dependencies. For example, the setup function defines render graph target 526 to create, read from, and write to. For read operations, the developer uses a target handle to specify the render graph target 526 to access from. For a write operation, the developer uses a target handle to specify the render graph target 526. The execute function resolves the target handles into render graph target 526 and performs graphics commands. The graphics commands can be added to a command buffer that is eventually submitted to a graphics processor. As show in FIG. 5, the render graph target 526 corresponds to a graphics API texture resource 528.

The render frame program object 514 provides a code-driven interface for developers that want to work at top programming level 530. Specifically, the render frame program object 514 allows a developer to build and manage the collection of nodes. The render frame program object 514 provides a built-in node implementation type referenced as a callback render graph node program object. The callback render graph node program object takes a setup and execution function as lambdas so that developers are able to create nodes without having to wrap the nodes with their own render graph node interface implementing types. The callback render graph node program object provides functionality for developers to write a pixel to screen from start to finish. The backend render engine 501 manages creating the render graph target 526 and aliasing, but the developer manages what gets rendered. For example, if a developer needs a shadow map, the developer would add a node to a render graph that produces one and uses one. As shown in FIG. 5, to use a render graph program object 524, the developer may utilize the render graph builder program object 522, which provides an interface for declaring the render graph targets 526.

Figure 6:
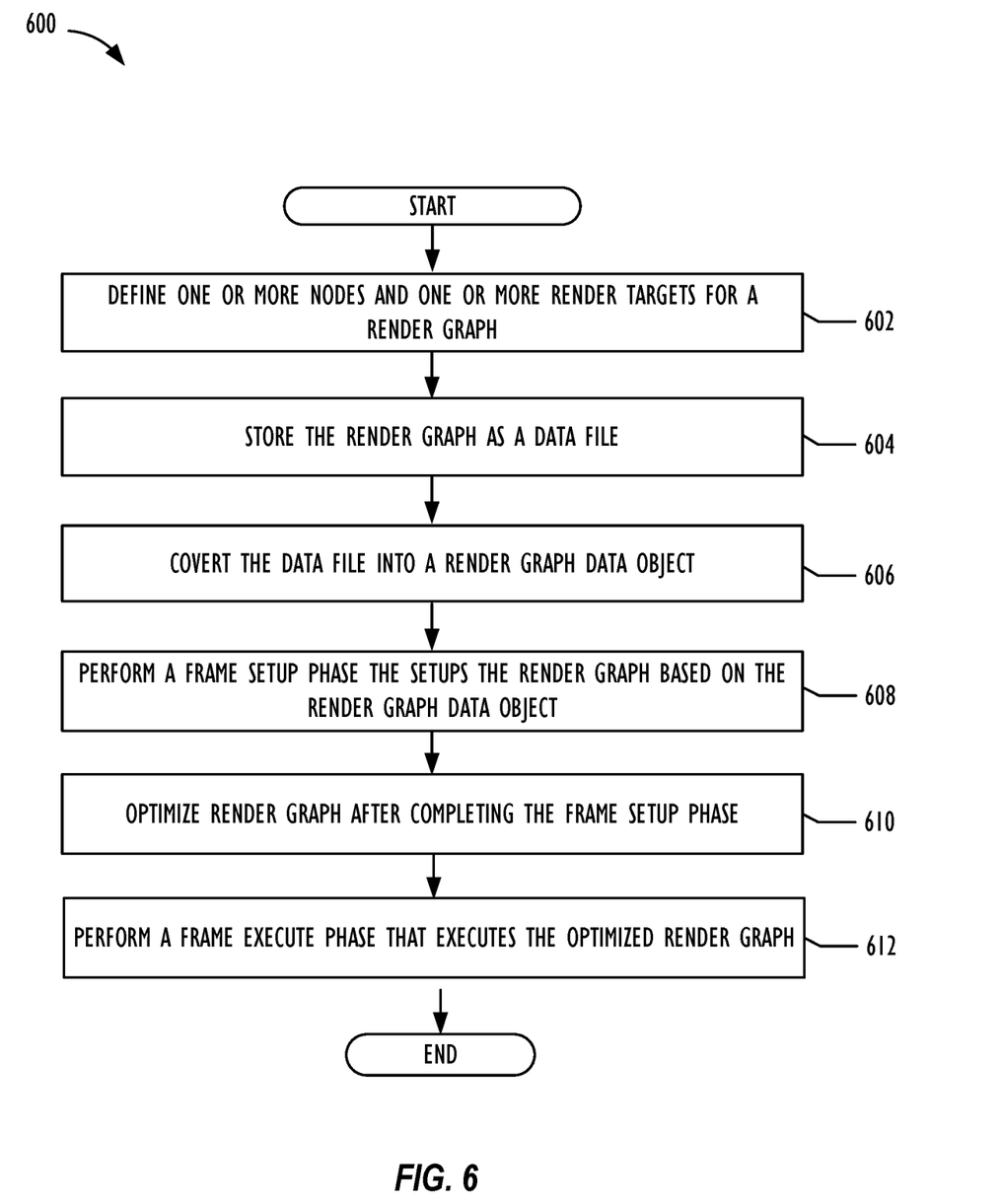
FIG. 6 depicts a flowchart illustrating a graphics processing operation that data-drive a render graph for a render frame.

FIG. 6 depicts a flowchart illustrating a graphics processing operation 600 that data-drive a render graph for a render frame. Operation 600 utilizes a render graph API to generate both data driven and code driven render graphs. The render graph API is able to support a variety of programming levels for interface with a backend render engine. The use and discussion of FIG. 5 is only an example to facilitate explanation and is not intended to limit the disclosure to this specific example. For example, although FIG. 6 illustrates that the blocks within operation 600 are implemented in a sequential order, operation 600 is not limited to this sequential order.

Operation 600 may start at block 602 and define one or more nodes and one or more render targets for a render graph. Operation 600 can define the render graph using a data-driven approach and/or code-driven approach. The render graph represents a render pipeline that can be executed as a render pass or as a render layer. Operation 600 may then move to block 604 and store the render graph as a data file (e.g., JSON data file). As a data file, the render graph becomes an asset that allows a developer to reuse or modify the render graph. Afterwards, operation 600 can proceed to block 606 and cover the data file into a render graph data object. At block 608, operation 600 performs a frame setup phase that setups the render graph based on the render graph data object. During the setup phase, operation 600 may declare target usage and dependencies between nodes and render targets.

After completing the setup phase, operation 600 moves to block 610 and optimizes the render graph for processing. In one or more embodiments, operation 600 analyzes target and/or buffer handle dependency graphs to determine whether a render graph includes unused render targets and/or nodes. Operation 600 may classify unused render targets and/or nodes based on whether their outputs are eventually connected to a frame buffer or other output from the render graph. If the render targets and/or nodes do not affect the output of the render graph, then operation 600 classifies the render targets and/or nodes as unused. Additionally or alternatively, operation 600 may also analyze render target usage declared during setup to manage the lifetime of command encoders used to encode graphics commands in a command buffer. Specifically, operation 600 evaluates whether nodes read from and/or written to are from the same render target. If so, then operation 600 combines the nodes together to improve the command encoding operation. After optimizing the render graph, operation 600 moves to block 612 and performs a frame execute phase that executes the optimized render graph.

Figure 7:
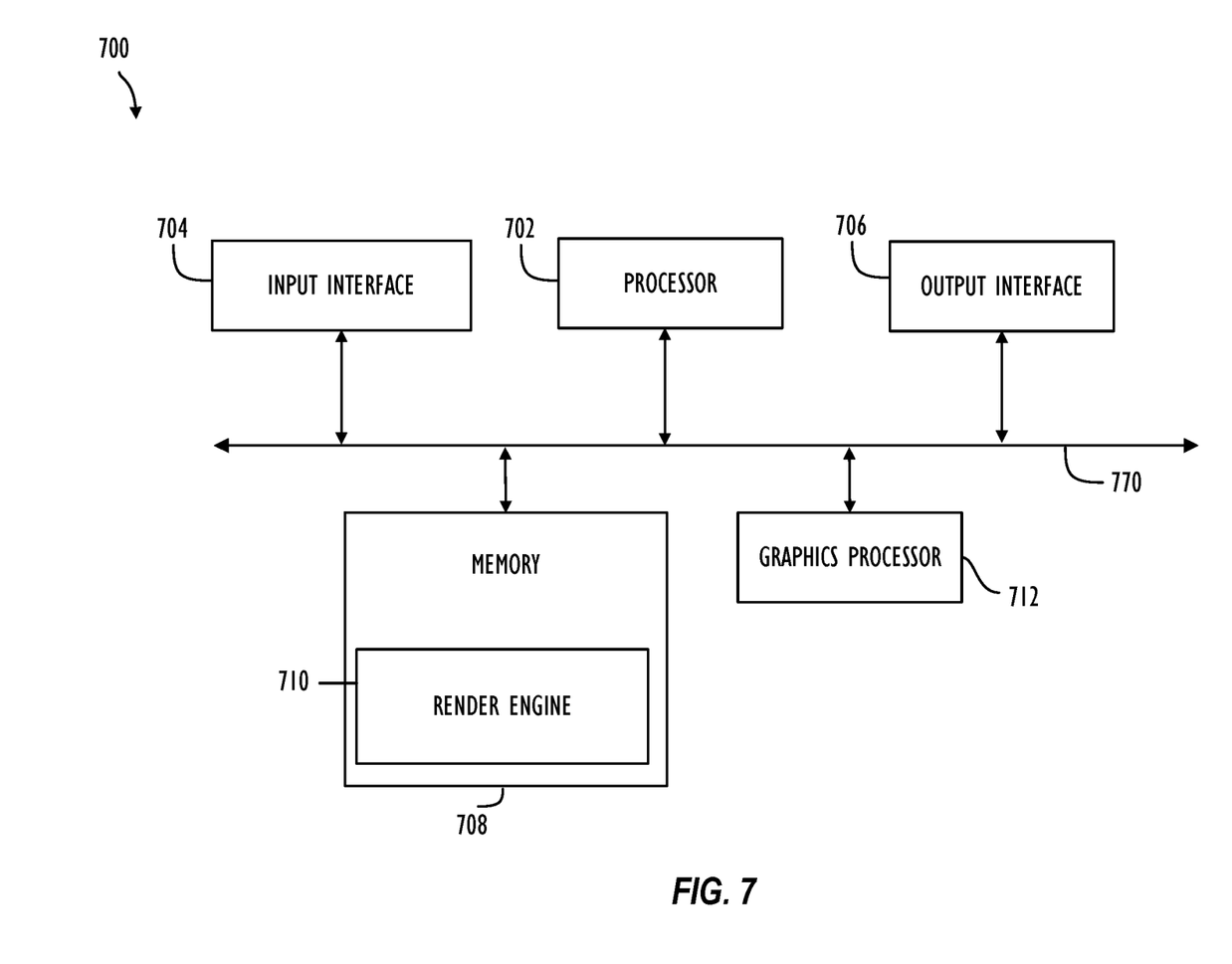
FIG. 7 is a simplified block diagram of a computing system, wherein embodiments of the present disclosure may operate.

FIG. 7 is a simplified block diagram of a computing system 700 that includes render graph API that may correspond to or may be part of a computer and/or any other computing device, such as a workstation, server, mainframe, super computer, and/or portable computing device. In one or more embodiments computing system 700 represents different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, organic light emitting diodes (OLEDs), LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 7 illustrates that the computing system 700 comprises a processor 702, which may be also be referenced as a CPU. The processor 702 may communicate (e.g., via a system bus 770) and/or provide instructions to other components within the computing system 700, such as the input interface 704, output interface 706, and/or graphics processor 712. In one embodiment, the processor 702 may comprise one or more multi-core processors and/or memory mediums (e.g., cache memory) that function as buffers and/or storage for data. Additionally, processor 702 may be part of one or more other processing components, such as application specific integrated circuits (ASICs), field-programmable gate arrays (FPGAs), and/or digital signal processors (DSPs). Although FIG. 7 illustrates that processor 702 may be a single processor, processor 702 is not so limited and instead may represent multiple processors. The processor 702 may be configured to implement any of the operations described herein, which include operation 600 as described in FIG. 6.

FIG. 7 illustrates that memory 708 may be operatively coupled to processor 702. Memory 708 may be a non-transitory medium configured to store various types of data. For example, memory 708 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

As shown in FIG. 7, memory 708 may be used to house the instructions for carrying out various embodiments described herein. In an embodiment, the memory 708 may comprise a render engine 710 that may be accessed and implemented by processor 702. Additionally or alternatively, render engine 710 may be stored and accessed within memory embedded in processor 702 (e.g., cache memory). The render engine 710 may be configured to provide computer executable instructions used for generating data driven rendering graphs. In one embodiment, the render engine 710 may be implemented using the render graph system 500 as shown in FIG. 5 and/or operation 600 as described in FIG. 6. In one embodiment, memory 708 may interface with a system bus 770 (e.g., a computer bus) so as to communicate and/or transmit information stored in memory 708 to processor 702 and/or graphics processor 712 during execution of software programs, such as software applications that comprise program code, and/or computer executable process steps that incorporate functionality described herein.

Persons of ordinary skill in the art are aware that software programs may be developed, encoded, and compiled in a variety computing languages for a variety software platforms and/or operating systems and subsequently loaded and executed by processor 702. In one embodiment, the compiling process of the software program, may transform program code written in a programming language to another computer language such that the processor 702 is able to execute the programming code. For example, the compiling process of the software program may generate an executable program that provides encoded instructions (e.g., machine code instructions) for processor 702 to accomplish specific, non-generic, particular computing functions, such as data-driving a render graph.

After the compiling process, the render engine 710 may be loaded as computer executable instructions or process steps to processor 702 from storage (e.g., memory 708, storage medium/media, removable media drive, and/or other storage device) and/or embedded within the processor 702. Processor 702 can execute the stored instructions or process steps in order to perform instructions or process steps (e.g., render engine 710) to transform computing system 700 into a non-generic, particular, specially programmed machine or apparatus. Stored data, e.g., data stored by a storage device, can be accessed by processor 702 during the execution of computer executable instructions or process steps to instruct one or more components within computing system 700.

FIG. 7 also illustrates that the processor 702 may be operatively coupled to an input interface 704 configured to receive image data, and output interface 706 configured to output and/or display the frames and a graphics processor 712 to render frames. The input interface 704 may be configured to obtain image data and/or other sensor-based information via cables, connectors, wireless connections and/or other communication protocols. In one embodiment, the input interface 704 may be a network interface that comprises multiple ports configured to receive and/or transmit data via a network. In particular, the network interface may transmit the image data via wired links, wireless link, and/or logical links. Other examples of the input interface 704 may be universal serial bus (USB) interfaces, CD-ROMs, DVD-ROMs and/or connections to one or more sensors. The output interface 706 may include to one or more connections for a graphic display (e.g., monitors), a printing device that produces hard-copies of the generated results, and/or a plurality of ports that transmit data via cables, connectors, wireless connections, and/or other communication protocols.

Reference in this disclosure to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily all referring to the same embodiment. The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

For purposes of this disclosure, the term "physical environment" refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, the term "computer-generated reality (CGR) environment" refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

As used herein, the term "virtual reality (VR) environment" refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, the term "mixed reality (MR) environment" refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

Within this disclosure, the term "augmented reality (AR) environment" refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

For purposes of this disclosure, "an augmented virtuality (AV) environment" refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

At least one embodiment is disclosed and variations, combinations, and/or modifications of the implementation(s) and/or features of the implementation(s) made by a person having ordinary skill in the art are within the scope of the disclosure. Alternative implementations that result from combining, integrating, and/or omitting features of the implementation(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Many other implementations will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory program storage device, readable by one or more processors and comprising instructions stored thereon to cause the one or more processors to:
    define one or more nodes for a render graph and one or more render targets associated with the nodes, wherein the nodes include one or more functions to define and resolve target handles for identifying render targets;
    define one or more connections between the nodes and render targets, wherein the one or more connections between the nodes and render targets form the render graph;
    store a render frame comprising the render graph and one or more second render graphs in one or more data files, wherein each of the render graph and the one or more second render graphs corresponds to a specific camera perspective of the render frame;
    convert, with a render graphics API, the one or more data files into a render graph data object; and
    perform a render frame setup phase that sets up the render graph and one or more second render graphs for a frame based, at least in part, on the render graph data object.

2. The non-transitory program storage device of claim 1, wherein the instructions further cause the processors to optimize the render graph and one or more second render graphs after completing the render frame setup phase.

3. The non-transitory program storage device of claim 2, wherein the instructions further cause the processors to perform a render frame execute phase that executes the optimized render graph and one or more second render graphs.

4. The non-transitory program storage device of claim 2, wherein the instructions that cause the processors to optimize the render graph and one or more second render graphs further comprises instructions to:
    analyze render target handles dependencies; and
    remove unused render targets and unused nodes from execution based on analyzing dependencies of the render target handles.

5. The non-transitory program storage device of claim 2, wherein the instructions that cause the processors to optimize the render graph and one or more second render graphs further comprises instructions to:
    analyze render target handles declared during the render frame setup phase;
    determine whether a set of nodes read from or write from to a single render target;
    assign a command encoder for the set of nodes.

6. The non-transitory program storage device of claim 1, wherein the render graph represents a render pipeline.

7. The non-transitory program storage device of claim 1, wherein the render graph corresponds to a render pass for rendering the frame.

8. The non-transitory program storage device of claim 1, wherein one of the nodes has a custom node type that allows for written code.

9. A system comprising:
    memory comprising instructions; and
    at least one processor coupled to memory, wherein the instructions, when executed, causes the at least one processor to:
        define one or more nodes for a render graph and one or more render targets associated with the nodes, wherein the nodes include one or more functions to define and resolve target handles for identifying render targets;
        define one or more connections between the nodes and render targets, wherein the one or more connections between the nodes and render targets form the render graph;
        store a render frame comprising the render graph and one or more second render graphs in one or more data files, wherein each of the render graph and the one or more second render graphs corresponds to a specific camera perspective of the render frame;
        convert, with a render graphics API, the one or more data files into a render graph data object; and
        perform a render frame setup phase that sets up the render graph and one or more second render graphs for a frame based, at least in part, on the render graph data object.

10. The system of claim 9, wherein the instructions further cause the at least one processor to optimize the render graph and one or more second render graphs after completing the render frame setup phase.

11. The system of claim 10, wherein the instructions further cause the at least one processor to perform a render frame execute phase that executes the optimized render graph and one or more second render graphs.

12. The system of claim 10, wherein the instructions that cause the at least one processor to optimize the render graph and one or more second render graphs further comprises instructions that cause the at least one processor to:
  analyze render target handles dependencies; and
  remove unused render targets and unused nodes from execution based on analyzing dependencies of the render target handles.

13. The system of claim 10, wherein the instructions that cause the at least one processor to optimize render graph further comprises instructions that cause the at least one processor to:
  analyze render target handles declared during the render frame setup phase;
  determine whether a set of nodes read from or write from to a single render target;
  assign a command encoder for the set of nodes.

14. The system of claim 9, wherein the render graph represents a render pipeline.

15. The system of claim 9, wherein the render graph corresponds to a render pass for rendering the frame.

16. The system of claim 9, wherein one of the nodes has a custom node type that allows for written code.

17. A computer-implemented method comprising:
  defining one or more nodes for a render graph and one or more render targets associated with the nodes, wherein the nodes include one or more functions to define and resolve target handles for identifying render targets;
  defining one or more connections between the nodes and render targets, wherein the one or more connections between the nodes and render targets form the render graph;
  storing a render frame comprising the render graph and one or more second render graphs in one or more data files, wherein each of the render graph and the one or more second render graphs corresponds to a specific camera perspective of the render frame;
  converting, with a render graphics API, the one or more data files into a render graph data object; and
  performing a render frame setup phase that sets up the render graph and one or more second render graphs for a frame based, at least in part, on the render graph data object.

18. The method of claim 17, further comprising optimizing the render graph and one or more second render graphs after completing the render frame setup phase.

19. The method of claim 18, further comprising performing a render frame execute phase that executes the optimized render graph and one or more second render graphs.

20. The method of claim 18, further comprising:
  analyzing render target handles dependencies; and
  removing unused render targets and unused nodes from execution based on analyzing dependencies of the render target handles.

* * * * *

UNITED STATES PATENT AND TRADEMARK OFFICE
CERTIFICATE OF CORRECTION

Page 1 of 1

PATENT NO. : 11,087,430 B2
APPLICATION NO. : 16/586370
DATED : August 10, 2021
INVENTOR(S) : Cody J. White et al.

It is certified that error appears in the above-identified patent and that said Letters Patent is hereby corrected as shown below:

In the Claims

Claim 4, at Column 16, Line 7, replace - "comprises" - with -- comprise --

Claim 5, at Column 16, Line 16, replace - "comprises" - with -- comprise --

Claim 12, at Column 17, Line 3, replace - "comprises" - with -- comprise --

Claim 13, at Column 17, Line 11, replace - "comprises" - with -- comprise --

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*